Patented Apr. 8, 1952

2,592,123

UNITED STATES PATENT OFFICE 2,592,123

PRODUCTION OF PYRIDINE NITRILES

William I. Denton, Woodbury, and Richard B. Bishop, Haddonfield, N. J., assignors to Socony-Vacuum Oil Company, Incorporated, a corporation of New York No Drawing. Application September 28, 1948, Serial No. 51,648

3 Claims. (Cl. 260—294.9)

This invention relates to a process for producing pyridine nitriles and is more particularly concerned with a catalytic process for producing pyridine nitriles from methyl-substituted pyridines.

Pyridine nitriles are organic compounds comprised essentially of a pyridine nucleus with one or more nitrile groups attached to the carbon atoms thereof. The formula may be represented as follows:

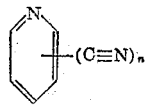

in which $n$ is at least 1 and may be equal to 5. The compounds are especially useful in organic syntheses and can be readily converted into many valuable products such as acids, amines, aldehydes, esters and the like.

As is well known to those familiar with the art, several processes have been proposed for the preparation of aromatic nitriles. In general, however, these processes have either been inapplicable to the preparation of pyridine nitriles or have been disadvantageous, even for the preparation of aromatic nitriles from one or more standpoints, namely, the relatively high cost of the reactants employed, and/or the toxic nature of some of the reactants, and/or the number of and complexity of the operations involved. For example, aromatic nitriles have been synthesized by reacting alkali cyanides with aromatic sulfonates or with aromatic-substituted alkyl halides; by reacting more complex cyanides such as potassium cuprocyanide, with diazonium halides; by reacting isothiocyanates with copper and with zinc dust; and by reacting arylaldoximes with acyl halides.

In accordance with copending United States patent application Serial Number 641,640, filed on January 16, 1946, now Patent No. 2,450,632, October 5, 1948, aromatic nitriles are produced from alkyl aromatic hydrocarbons, in a simple, inexpensive process which employs non-toxic reactants. Briefly, the process there disclosed comprises the reaction of alkyl aromatic hydrocarbons with ammonia, at elevated temperatures, in the presence of a catalytic material containing a molybdenum oxide.

It has now been discovered that pyridine nitriles can be produced by reacting a methyl-substituted pyridine with ammonia, in the presence of a molybdenum oxide catalyst.

This invention is to be distinguished from the conventional processes for the production of hydrogen cyanide wherein carbon compounds, such as carbon monoxide, methane, and benzene are reacted with ammonia at elevated temperatures in the presence of alumina, nickel, quartz, clays, oxides of thorium and cerium, copper, iron oxide, silver, iron, cobalt, chromium, aluminum phosphate and the like. The process of the present invention is also to be distinguished from the processes of the prior art for the production of amines wherein hydrocarbons are reacted with ammonia at high temperatures, or at lower temperatures in the presence of nickel or cobalt.

Broadly stated, this invention provides an inexpensive and commercially feasible process for the production of pyridine nitriles, which comprises reacting a methyl-substituted pyridine with ammonia, in the gaseous state, at elevated temperatures, and in the presence of a catalytic material containing a molybdenum oxide.

Generally speaking, any methyl-substituted pyridine is suitable as the pyridine reactant in the process of this invention. Accordingly, it must be clearly understood that by methyl-substituted pyridine it is meant any pyridine having at least one and up to five hydrogen atoms of the pyridine nucleus replaced by a methyl radical. Methyl pyridines, such as alpha-picoline, beta-picoline, gamma-picoline, and 2,4-dimethyl pyridine, 2,6-dimethyl pyridine, and 2,4,6-trimethyl pyridine are examples of suitable methyl-substituted pyridine reactants.

The proportions of reactants, i. e., methyl-substituted pyridine reactant and ammonia, to be used in this process may be varied over a wide range with little effect upon the conversion per pass and the ultimate yield. In general the charge of reactants may contain as little as two mol per cent or as much as ninety-eight mol per cent of the methyl-substituted pyridine reactant. In practice, however, it is preferred to use charges containing between about twenty mol per cent and about ninety mol per cent of the methyl-substituted pyridine reactant and, ordinarily, it is preferred to use charges containing a molar excess of ammonia over that of the methyl-substituted pyridine reactant.

It has been found that the catalyst to be used to produce the pyridine nitriles by reacting a methyl-substituted pyridine with ammonia, are those containing a molybdenum oxide, such as molybdenum sesquioxide ($Mo_2O_3$), molybdenum dioxide ($MoO_2$), molybdenum trioxide ($MoO_3$), and molybdenum pentoxide ($Mo_2O_5$). In the interest of brevity, it should be understood that references hereinafter to molybdenum oxide, in this specification and in the claims, refers not to one but to all of the various oxides of molybdenum, as set forth hereinbefore. Of these various oxides, molybdenum trioxide is preferred.

While all of the various oxides mentioned are effective when used per se, they generally possess additional catalytic activity when used in conjunction with the well known catalyst supports such as alumina, silica gel, Carborundum, pumice, clays and the like. Activated alumina and alumina gel have been found to be particularly desirable catalyst supports for the purpose of the present process. Without any intent of limiting the scope of the present invention, it may be noted that enhanced catalytic activity of the supported catalysts is apparently attributable primarily to their relatively large surface area.

The concentration of the various oxides in the supported catalyst influences the conversion per pass. In general, the conversion per pass increases with an increase in the concentration of the molybdenum oxide. For example, it has been found that a catalyst comprising twenty parts by weight of molybdenum trioxide on eighty parts by weight of activated alumina is more effective than one comprised of ten parts by weight of the molybdenum trioxide on ninety parts by weight of the activated alumina. It is to be understood, however, that supported catalysts containing larger or smaller amount of molybdenum oxides may be used in the process.

It has been found also that in order to obtain initial maximum catalytic efficiency, particularly when the catalytic material comprises the higher molybdenum oxides, the catalyst should be conditioned prior to use in the process. As defined herein, conditioned catalysts are those which have been exposed to ammonia or hydrogen, or both, for a period of time, several minutes to several hours, depending upon the quantity, at temperatures varying between about 800° F. and about 1300° F. However, if desired, the conditioning treatment may be dispensed with inasmuch as the catalyst becomes conditioned during the initial stages of the process when the catalyst comes into contact with the ammonia reactant.

In operation, the catalysts become fouled with carbonaceous material which ultimately affects their catalytic activity. Accordingly, when the efficiency of the catalyst declines to a point where further operation becomes uneconomical, or disadvantageous from a practical standpoint, the catalyst may be regenerated, as is well known in the art, by subjecting the same to a careful oxidation treatment, for example, by passing a stream of air or air diluted with flue gases over the catalyst under appropriate temperature conditions and for a suitable period of time, such as the same period of time as that of the catalytic operation. Preferably, the oxidation treatment is followed by a purging treatment, such as passing over the catalyst a stream of purge gas, for example, nitrogen, carbon dioxide, hydrocarbon gases, or the like.

The reaction or contact time, that is, the period of time during which a unit volume of the reactants is in contact with a unit volume of catalyst, may vary between a fraction of a second and several minutes. Thus, the contact time may be as low as 0.01 second and as high as 20 minutes. Contact times varying between 0.1 second and one minute, particularly, between 0.3 second and 30 seconds, are preferred. It must be realized that these figures are at best estimates based on a number of assumptions. For all practical purposes, as in catalytic processes of the type of the present invention, the more reliable data on contact time is best expressed, as is well known in the art, in terms of liquid space velocities, in the present instance, the volume of liquid methyl-substituted pyridine reactant per volume of catalyst per hour. For example, at atmospheric pressure, it has been found that the space velocities may be varied considerably and that velocities varying between about one-fourth and about four are quite satisfactory for the purposes of the present invention.

In general, the temperatures to be used in this process vary between about 850° F. and the decomposition temperature of ammonia (about 1250–1350° F.), and preferably, temperatures varying between about 925° F. and about 1075° F. Generally speaking, the higher temperatures increase the conversion per pass but they also increase the decomposition of the reactants thereby decreasing the ultimate yields of pyridine nitriles. Accordingly, the criteria for determining the optimum temperature to be used in any particular operation will be based on the nature of the methyl-substituted pyridine reactant, the type of catalyst, and a consideration of commercial feasibility from the standpoint of striking a practical balance between conversion per pass and losses as a result of decomposition.

The process of the present invention may be carried out at superatmospheric, atmospheric or subatmospheric pressure. Superatmospheric pressures are advantageous in that the unreacted charge materials condense more readily. Subatmospheric pressure appear to favor the reactions involved since the reaction products have a larger volume than the reactants, and hence, it is evident from the law of Le Chatelier-Braun that the equilibrium favors nitrile formation more at reduced pressures. However, such pressures reduce the throughput of the reactants and present increased difficulties in recycling unreacted charge materials. Therefore, atmospheric pressure or superatmospheric pressures are preferred.

At the present time, the reaction mechanism involved in the process of the present invention is not fully understood. Fundamentally, the simplest possible method of making pyridine nitriles is to introduce nitrogen directly into the methyl radical of the methyl-substituted pyridine reactant molecule, thereby avoiding intermediate steps with their accompanying increased cost. In the present process, it has been noted that considerable amounts of hydrogen are evolved; hence, it is postulated, without any intent of limiting the scope of the present invention, that the pyridine nitriles are formed in accordance with the following equations, using gamma-picoline and sym-collidine as examples:

1. 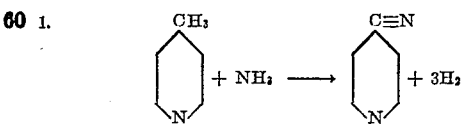

2. 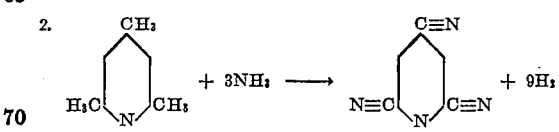

The present process may be carried out by making use of any of the well known techniques for operating catalytic reactions in the vapor phase effectively. By way of illustration, gamma-picoline and ammonia may be brought together in suitable proportions and the mixture vaporized in a preheating zone. The vaporized mixture may then be introduced into a reaction zone containing a catalyst of the type defined hereinbefore. The reaction zone may be a chamber of any suitable type useful in contact-catalytic operations; for example, a catalyst bed contained in a shell, or a shell through which the catalyst flows concurrently, or countercurrently, with the reactants. The vapors of the reactants are maintained in contact with the catalyst at a predetermined elevated temperature and for a predetermined period of time, both as set forth hereinbefore, and the resulting reaction mixture is passed through a condensing zone into a receiving chamber. It will be understood that when the catalyst flows concurrently, or countercurrently, with the reactants in the reaction chamber, the catalyst will be thereafter suitably separated from the reaction mixture by filtration or the like.

The reaction products will be predominantly isonicotinic nitrile, hydrogen, unchanged gamma-picoline, and unchanged ammonia. The isonicotinic nitrile and the unchanged gamma-picoline may be condensed by passing the products through a condensing zone and will be retained in the receiving chamber. The isonicotinic nitrile can be separated from the unchanged gamma-picoline by any of the numerous and well known separation procedures such as fractional distillation. Similarly, the uncondensed hydrogen and the unchanged ammonia can easily be separated from each other. The unchanged gamma-picoline and ammonia can be recycled with or without fresh gamma-picoline and ammonia.

It will be apparent that the process may be operated as a batch or discontinuous process as by using the catalyst-bed-type reaction chamber in which the catalytic and regeneration operations alternate. With a series of such reaction chambers, it will be seen that as the catalytic operation is taking place in one or more of the reaction chambers, regeneration of the catalyst can be taking place in one or more of the other reaction chambers. Correspondingly, the process may be continuous when one or more catalyst chambers are used through which the catalyst flows in contact with the reactants. In such a continuous process, the catalyst will flow through the reaction zone in contact with the reactants and will thereafter be separated from the reaction mixture as, for example, by accumulating the catalyst on a suitable filter medium, before condensing the reaction mixture. In a continuous process, therefore, the catalyst—fresh or regenerated—and the reactants—fresh or recycled—will continuously flow through a reaction chamber.

The following detailed example is for the purpose of illustrating a mode of preparing pyridine nitriles in accordance with the process of this invention, it being clearly understood that the invention is not to be construed as limited to the specific methyl-substituted pyridine reactant disclosed hereinafter or to the specific manipulations and conditions set forth in the example.

It will be apparent to those skilled in the art that a wide variety of other pyridine nitriles may be prepared by a suitable choice of the methyl-substituted pyridine reactant and suitable proportioning of reactants.

*Example*

Gamma-picoline and ammonia were charged into a stainless steel reactor designed to hold catalyst, in a molar proportion of 1:2, respectively. A liquid space velocity of 1.0 and a catalyst temperature of 1000° F., and atmospheric pressure were used. The catalyst was ⅛ pellets of 10% molybdenum trioxide on activated alumina. 1½% by weight of the gamma-picoline charged was converted to isonicotinic nitrile per pass.

It will be apparent that the present invention provides an efficient, inexpensive and safe process for obtaining pyridine nitriles. The process is of considerable value in making available relatively inexpensive pyridine nitriles which are useful, for example, as intermediates in organic syntheses.

Although the present invention has been described in conjunction with certain embodiments, it is to be understood that modifications and variations therein may be made without departing from the spirit and scope of the invention, as those skilled in the art will readily understand. Such variations and modifications are considered to be within the purview and scope of the appended claims.

We claim:

1. The process for producing isonicotinic nitrile, which comprises contacting, as sole reactants, gamma-picoline with ammonia, in gaseous phase, at temperatures falling within the range varying between about 850° F. and about 1250° F., in the presence of a catalyst containing a molybdenum oxide.

2. The process for producing isonicotinic nitrile, which comprises contacting, as sole reactants, gamma-picoline with ammonia, in gaseous phase, at temperatures falling within the range varying between about 925° F. and about 1075° F., in the presence of a molybdenum oxide supported on a catalyst support.

3. The process for producing isonicotinic nitrile, which comprises contacting, as sole reactants, gamma-picoline with ammonia, in gaseous phase, at temperatures falling within the range varying between about 925° F. and about 1075° F., in the presence of molybdenum trioxide supported on alumina.

WILLIAM I. DENTON.
RICHARD B. BISHOP.

REFERENCES CITED

The following references are of record in the file of this patent:

UNITED STATES PATENTS

| Number | Name | Date |
| --- | --- | --- |
| 2,299,755 | Jolly | Oct. 27, 1942 |
| 2,338,571 | Cislak | Jan. 4, 1944 |
| 2,430,804 | Cislak | Nov. 11, 1947 |
| 2,456,380 | Cislak | Dec. 14, 1948 |
| 2,510,605 | Porter | June 6, 1950 |